United States Patent [19]

Finnegan

[11] Patent Number: 4,941,246
[45] Date of Patent: Jul. 17, 1990

[54] RASPING DEVICE

[76] Inventor: Danny E. Finnegan, 6840 Hickory Ave., Orangevale, Calif. 95662

[21] Appl. No.: 409,084

[22] Filed: Sep. 19, 1989

[51] Int. Cl.$^5$ ...................... B23D 71/04; B23D 71/06
[52] U.S. Cl. .......................................... 29/78; 29/80; 16/114 R; 279/42; 279/48; 279/101
[58] Field of Search ................... 29/78, 80; 16/114 R; 279/42, 48, 51, 69, 94, 101

[56] References Cited

U.S. PATENT DOCUMENTS

| | | | |
|---|---|---|---|
| 208,256 | 9/1878 | Millspaugh | 29/80 |
| 288,045 | 11/1883 | French | 29/80 |
| 1,243,310 | 10/1917 | Littman | 29/80 |
| 2,573,325 | 10/1951 | Fowlie | 29/80 |
| 2,676,811 | 4/1954 | Kindley | 29/80 |
| 4,327,465 | 5/1982 | Moritsch | 29/80 |

FOREIGN PATENT DOCUMENTS

| | | | |
|---|---|---|---|
| 2227077 | 11/1974 | France | 279/48 |
| 827169 | 2/1960 | United Kingdom | 279/48 |

Primary Examiner—William E. Terrell
Attorney, Agent, or Firm—Donald E. Nist

[57] ABSTRACT

The improved rasping device can be either a rasp or file and includes an elongated blade with a plurality of rasping protrusions on the middle portion thereof and with an integral narrow tang extending rearwardly thereof along the longitudinal midline thereof. The tang extends into the closed front end of a hollow shell defining a central cavity and is sealed thereto. The shell has an open rear end. A generally cylindrical externally threaded pinch tube grips the rear end of the tang, which is wedgingly received in a transverse slot in the front end of the pinch tube. The slot may be lined with teeth or the like to increase the grip on the tang, and the tang can be partially pinned thereto. The shell and pinch tube define with a rear cap the handle of the device and can be of metal, plastic or the like. The cap has a flared peripheral portion and a forwardly projecting central tubular portion bearing an internally threaded passageway screwed forward over the pinch tube to force it to tightly grip the tang and rigidly hold the handle in place. The pinch tube can be forwardly flared to increase the gripping action on the tang when the cap is screwed thereover.

6 Claims, 1 Drawing Sheet

U.S. Patent   Jul. 17, 1990   4,941,246
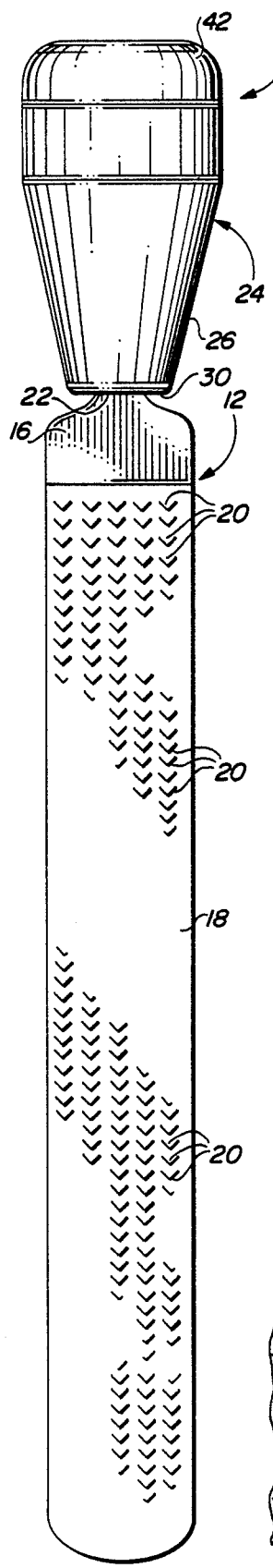
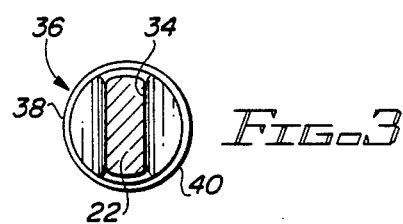
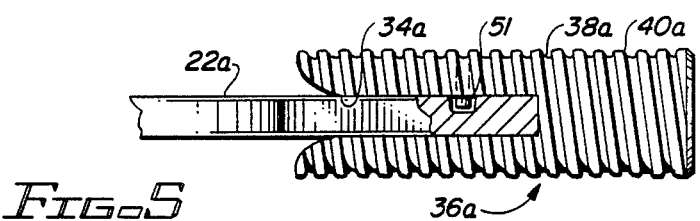
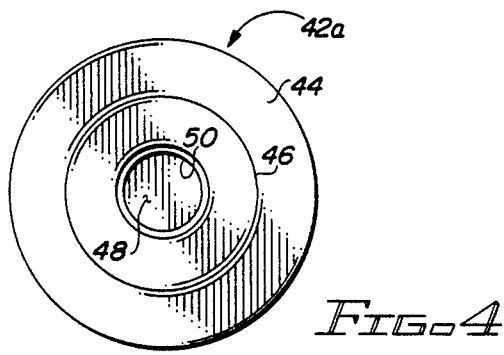
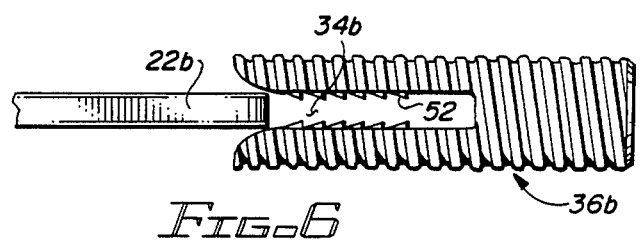
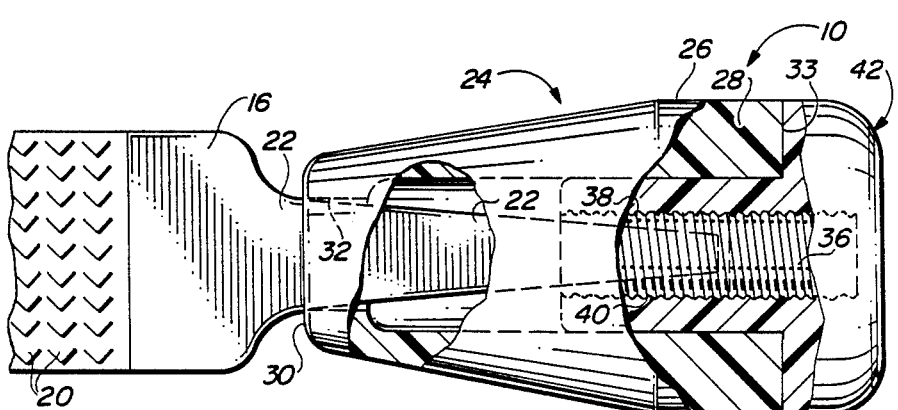

RASPING DEVICE

BACKGROUND OF THE INVENTION

1. Field of the Invention

The present invention generally relates to work tools and more particularly to an improved rasping device or file.

2. Prior Art

Conventional files and rasps have metal, wood or plastic handles tapped onto the narrow tang end of a rasp blade or file blade. Since the rasp or file is normally used by forcing it at an oblique angle against a surface to be filed or rasped, the handle is under a torquing stress and usually works loose over a period of time, rendering the rasp or file useless until tapped on again, pinned in place or replaced. This is especially true for heavy duty rasps such as those used to rasp horses hooves and the like, where normally a relatively large pressure is exerted over a relatively large period of time against the handle. Although certain rasps and files have been made with integral handles of metal, such handles are usually very uncomfortable to use and are not used very often or over a long period of time.

There remains a need for an improved file or rasp which has a comfortable handle separately applied to the rasp blade or file blade but which will not work loose during normal long-continued usage of the rasp or file, even on heavy duty work such as the filing and rasping of horses hooves.

SUMMARY OF THE INVENTION

The improved rasping device of the present invention satisfies all the foregoing needs. The device is substantially as set forth in the Abstract of the Disclosure. By rasping device as used herein is meant a device which either rasps or files and is generally known as a rasp or file.

The rasping device includes a preferably generally flat elongated blade bearing a rasping area having a plurality of rasping protrusions and a rearwardly extending narrow tang having a generally triangular shape. The tang extends along the longitudinal midline of the blade and is integral therewith. The rear end of the tang extends into and is wedged in the closed front end of a hollow shell forming part of the handle. The shell has an open rear end.

Inside the cavity defined by the shell, a pinch tube which is generally cylindrical with external threads on the sides thereof is wedged on the tang end. Thus, the tang end is wedgingly received in a transverse slot in the front end of the pinch tube. The pinch tube may be forwardly flared and/or have a pin running through a part thereof and the tang end to hold the tang in place. The surfaces lining the slot may be toothed to aid the gripping action of the pinch tube on the tang. The pinch tube is centered axially in the space.

A rear end cap is also part of the handle and includes a peripheral flared portion and a central forwardly extending tubular portion bearing a central longitudinally extending passageway which is internally threaded and which screws onto the rear end of the pinch tube compressing it against the tang to hold the tang tight in the slot. Screwing on the end cap forwardly also wedges the shell tightly against the triangular tang as well as locking the peripheral portion of the end cap tightly against the rear end of the shell. The net result is a handle which is firmly and permanently locked in place on the tang and which will not work loose during use of the rasp or file. The handle can be formed of wood, plastic or metal or the like. The device can be made inexpensively in a variety of sizes and shapes.

Various other features of the improved rasping device of the present invention are set forth in the following detailed description and accompanying drawings.

DRAWINGS

FIG. 1 is a schematic fragmentary top plan view of a preferred embodiment of the improved rasping device of the present invention;

FIG. 2 is a schematic enlarged fragmentary top plan view, partly broken away, of the handle and tang portions of the device of FIG. 1;

FIG. 3 is a schematic front elevation of the pinch tube of FIG. 1, shown with a portion of the tang of FIG. 1 therein;

FIG. 4 is a schematic front elevation of the rear end cap of FIG. 1;

FIG. 5 is a schematic side elevation of a modified version of the pinch tube of FIG. 1, shown with a portion of the tang pinned therein; and, FIG. 6 is a schematic side elevation of a further modified version of the pinch tube of the present invention.

DETAILED DESCRIPTION

FIGS. 1–4

Now referring more particularly to FIGS. 1–4 of the present invention, a preferred embodiment of the improved rasping device of the present invention is schematically depicted therein. Thus, device 10 is shown which comprises a generally flat elongated rasping blade 12 having a front end 14, rear end 16 and intermediate portion 18, the latter bearing a plurality of spaced rasping protrusions 20. Rear end 16 has a narrow wedgeshaped or triangular integral tang 22 extending rearwardly therefrom along the longitudinal midline of blade 12. Blade 12 and tang 22 can be made of tempered steel or the like.

Device 10 also includes a handle 24, comprising a hollow shell 26 defining a central cavity 28 therein. Shell 26 has a generally closed front end 30 bearing a slit 32 through which a portion of tang 22 is wedgingly received and firmly held, and an open rear end 33. Tang 22 extends into cavity 28 and into a slot 34 in the front end of a generally cylindrical pinch tube 36 bearing external screw threads 38 on the sidewalls 40 thereof. Tube 36 grips tang 22 to hold handle 24 in place.

Handle 24 also includes a rear end cap 42 comprising a peripheral circular flared end portion 44 and a central forwardly extending tubular portion 46, the latter bearing a longitudinal tubular passageway 48 therein which has internal screw threads 50 to match threads 38 on tube 36.

When tang 22 and blade 12 are to be locked to handle 24, shell 26 is first slid onto tang 22 and pushed forward until it wedgingly abuts tang 22. Then pinch tube 36 is pushed forward in cavity 28 until it is wedged on tang 22, after which end cap 42 is threaded on handle 24 so that threads 50 fully engage threads 38 as far forward as cap 42 can go, thus forcing pinch tube tightly against tang 22, and simultaneously forcing shell 26 forward on tang 22 to wedgingly seat thereon, while locking end cap 42 to shell 24.

This unique three way action assures that handle 24 becomes permanently locked to blade 12 and tang 22 and will not work loose during use of device 10. Accordingly, device 10 is improved over conventional rasping devices.

It will be understood that blade 12 could be a file blade instead of a rasp blade and that protrusions 20 could be file lands instead of rasp protrusions. Handle 24 can be formed of plastic, wood, metal, ceramic, cermet or the like durable material and can be inexpensively and durably fabricated in a variety of shapes and sizes.

FIG. 5

A modified version of the pinch tube used in the present device is schematically depicted in FIG. 5. Thus, pinch tube 36a is shown which differs from tube 36 only in that tube 36a is more elongated and bears a stop pin 51 which passes through one sidewall 40a thereof and into tang 22a disposed in slot 34a, in order to partially pin tang 22a therein. Tube 36a has substantially the advantages of tube 36.

FIG. 6

A further version of the pinch tube of the present invention is schematically depicted in FIG. 6. Thus, pinch tube 36b is shown therein. Tube 36b is substantially identical to tube 36 except for a slight size difference and the fact that tube 36b is flared at its forward end and bears teeth 52 lining slot 34b therein, both of which modifications aid in tube 36b securely gripping tang 22b when the latter is placed therein. Tube 36b has substantially the advantages of tube 36.

Various other modifications, changes, alterations and additions can be made in the improved rasping device of the present invention and in the components and parameters thereof. All such modifications, changes, alterations and additions as are within the scope of the appended claims form part of the present invention.

What is claimed is:

1. An improved rasping device, said device comprising, in combination:
   (a) an elongated blade having a front end and an opposite rear end joined by a middle portion bearing a plurality of rasping protrusions, said rear end bearing a narrow tang projecting rearwardly thereof along the longitudinal midline thereof; and,
   (b) an improved handle, said handle comprising, in combination, a front hollow shell having a closed front end and an open rear end defining a central cavity, said tang projecting through a slit in said closed front end into said cavity and being sealed thereto, a separate, generally cylindrical pinch tube in said cavity and bearing external threading and a transverse slot in the front end thereof into which the rear end of said tang wedgingly seats in said shell, and a rear cap having a flared rear peripheral portion connected to a forwardly projecting central tubular portion, the latter having a central passageway bearing internal threading, said tubular portion being screwed forward over and in contact with said pinch tube in said cavity to wedge it tightly around said rear end of said tang and cause said flared portion of said cap to abut the rear end of said shell, whereby said handle is held tightly on said blade.

2. The improved rasping device of claim 1 wherein said blade and tang are integral.

3. The improved rasping device of claim 1 wherein said pinch tube is flared forwardly so as to clamp down on said tang end wherein said central tubular portion of said cap is screwed forwardly thereover.

4. The improved rasping device of claim 3 wherein said pinch tube slot is bordered by protrusions facing into said slot from said pinch tube to securely grip said tang.

5. The improved rasping device of claim 1 wherein said pinch tube is pinned to said tang.

6. The improved rasping device of claim 1 wherein said pinch tube slot is bordered by protrusions facing into said slot from said pinch tube to securely grip said tang.

* * * * *